United States Patent
Stone

(10) Patent No.: US 9,689,306 B2
(45) Date of Patent: Jun. 27, 2017

(54) METHOD FOR SUPERCRITICAL DIESEL COMBUSTION

(75) Inventor: Christopher S. Stone, Rio Bueno (CL)

(73) Assignee: WSC THREE S.A., Santiago (CL)

( * ) Notice: Subject to any disclaimer, the term of this patent is extended or adjusted under 35 U.S.C. 154(b) by 0 days.

(21) Appl. No.: 13/517,861

(22) Filed: Jun. 14, 2012

(65) Prior Publication Data

US 2012/0318226 A1    Dec. 20, 2012

Related U.S. Application Data

(60) Provisional application No. 61/496,887, filed on Jun. 14, 2011.

(51) Int. Cl.
| | | |
|---|---|---|
| *F02B 43/00* | (2006.01) | |
| *F02B 25/04* | (2006.01) | |
| *F02M 21/02* | (2006.01) | |
| *F02D 19/06* | (2006.01) | |
| *F02D 19/10* | (2006.01) | |
| *F02B 3/06* | (2006.01) | |
| *F02B 75/02* | (2006.01) | |

(52) U.S. Cl.
CPC .......... *F02B 25/04* (2013.01); *F02D 19/0647* (2013.01); *F02D 19/10* (2013.01); *F02M 21/0215* (2013.01); *F02B 3/06* (2013.01); *F02B 2075/025* (2013.01); *Y02T 10/32* (2013.01); *Y02T 10/36* (2013.01)

(58) Field of Classification Search
USPC .......... 123/1 A, 431, 432, 433, 304, 27 GE, 123/559.1, 575
See application file for complete search history.

(56) References Cited

U.S. PATENT DOCUMENTS

| | | |
|---|---|---|
| 4,892,561 A | 1/1990 | Levine |
| 5,632,786 A | 5/1997 | Basu et al. |
| | (Continued) | |

FOREIGN PATENT DOCUMENTS

GB    2413824    11/2005

OTHER PUBLICATIONS

Chapman et al. "Pilot Ignited Premixed Combustion of Dimethyl Ether in a Turbodiesel Engine" Fuel Processing Technology, vol. 89, Issue 12, Dec. 2008, pp. 1262-1271.

*Primary Examiner* — Hung Q Nguyen
*Assistant Examiner* — Ruben Picon-Feliciano
(74) *Attorney, Agent, or Firm* — Merek, Blackmon & Voorhees, LLC

(57) ABSTRACT

A method for supercritical diesel combustion combines fumigation and supercritical diesel fuel combustion to effect greater fuel efficiency and reduce exhaust gas pollutants from a compression ignition engine. The invention utilizes the fumigant method by combining two gases (DME and propane) which autoignite prior to the injection of the liquid diesel fuel. This pre-combustion of the fumigant gases combined with the engine's compression of the combustion chamber gases is managed to attain a supercritical combustion chamber environment into which the liquid diesel fuel is injected. This targeted supercritical combustion chamber environment causes the diesel fuel to become a supercritical fluid prior to combustion, resulting in significantly greater efficiency and negligible exhaust gas pollutants resulting from the combustion of the diesel fuel.

23 Claims, 1 Drawing Sheet

(56) References Cited

U.S. PATENT DOCUMENTS

| | | | |
|---|---|---|---|
| 6,095,102 | A | 8/2000 | Willi et al. |
| 6,145,495 | A | 11/2000 | Whitcome |
| 6,202,601 | B1 | 3/2001 | Ouellette et al. |
| 6,206,940 | B1 | 3/2001 | Weissman et al. |
| 6,213,104 | B1 * | 4/2001 | Ishikiriyama et al. ....... 123/557 |
| 6,286,482 | B1 | 9/2001 | Flynn et al. |
| 6,324,827 | B1 | 12/2001 | Basu et al. |
| 6,607,567 | B1 | 8/2003 | Towfighi |
| 6,901,889 | B1 | 6/2005 | Ritter et al. |
| 7,225,763 | B2 | 6/2007 | Ritter et al. |
| 7,488,357 | B2 | 2/2009 | Tavlarides et al. |
| 2007/0089707 | A1 | 4/2007 | Weber et al. |
| 2009/0183423 | A1 | 7/2009 | Tavlarides et al. |
| 2013/0233941 | A1 * | 9/2013 | Cheiky et al. ................ 239/133 |

\* cited by examiner

METHOD FOR SUPERCRITICAL DIESEL COMBUSTION

CROSS REFERENCE TO RELATED APPLICATIONS

The present application claims the benefit of the filing date of U.S. Provisional Patent Application Ser. No. 61/496,887, filed Jun. 14, 2011. The foregoing application is incorporated by reference in its entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to internal combustion engines, and more particularly to an improved method for generating a supercritical combustion chamber environment for compression ignition engines.

BACKGROUND INFORMATION AND DISCUSSION OF RELATED ART

The inventor of the diesel engine, Rudolph Diesel—1897, used "natural gas" as a diesel engine fumigant fuel charge. Fumigation of a diesel engine is the addition of a gaseous fuel to the intake air charge of a diesel engine. Development of diesel engine fumigation techniques has continued, such as that disclosed in Ritter et al. U.S. Pat. No. 6,901,889.

The pre-heating of diesel fuel to improve combustion efficiency and reduce exhaust gas pollutants has been active since the 1930's. Hypergolic diesel combustion received significant attention in the 1980's. More recently Tavlarides et al. U.S. Pat. No. 7,488,357 and others disclose methods and apparatus which cause diesel fuel to become supercritical prior to injection into the combustion chamber.

U.S. Pat. No. 4,892,561 to Levine discloses fuels for internal combustion engines which contain at least 50% by weight of methyl ether.

U.S. Pat. No. 5,632,786 to Basu et al. describes a method for operating a spark ignition internal combustion engine utilizing an improved composition containing dimethyl ether and propane as fuel.

U.S. Pat. No. 6,095,102 to Willi et al. teaches a dual fuel engine which creates a substantially homogeneous mixture of gaseous fuel, air, and pilot fuel during a compression stroke.

U.S. Pat. No. 6,145,495 to Whitcome discloses a propane injection system for a diesel engine.

U.S. Pat. No. 6,202,601 to Ouellette et al. describes a method and apparatus for dual fuel injection into an internal combustion engine. A main fuel is ignited by a pilot fuel that is more readily flammable than the main fuel.

U.S. Pat. No. 6,206,940 to Weissman et al. teaches fuel formulations to extend the lean limit.

U.S. Pat. No. 6,213,104 to Ishikiriyama et al. discloses supplying fuel to an internal combustion engine in a supercritical state by raising the pressure and the temperature of the fuel above the critical pressure and temperature.

U.S. Pat. No. 6,286,482 to Flynn, et al. describes a premixed charge compression ignition engine with combustion control.

U.S. Pat. No. 6,324,827 to Basu et al. teaches a method of generating power in a dry low NOx combustion system.

U.S. Pat. No. 6,607,567 to Towfighi discloses propellant gas for tools operated by combustion power on the basis of combustible gases containing a mixture of 40% to 70% by weight of dimethyl ether, nitrous oxide and/or nitromethane, 8% to 20% by weight of propylene, methyl acetylene, propane and/or propadiene and 20% to 45% by weight of isobutane and/or n-butane.

U.S. Pat. Nos. 6,901,889 and 7,225,763 to Ritter, et al. describes a system and method to reduce particulate and NOx emissions from diesel engines through the use of a duel-fuel fumigation system.

U.S. Pat. No. 7,488,357 to Tavlarides, et al. teaches a composition of diesel, biodiesel or blended fuel with exhaust gas mixtures or with liquid $CO_2$. The composition is in a liquid state near the supercritical region or a supercritical fluid mixture such that it quasi-instantaneously diffuses into the compressed and hot air as a single and homogeneous supercritical phase upon injection in a combustion chamber.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The method for supercritical diesel combustion of the present invention combines fumigation and supercritical diesel fuel combustion to effect greater fuel efficiency and reduce exhaust gas pollutants from a compression ignition engine such as a diesel engine. The invention utilizes the fumigant method by combining two gases (DME and propane) which autoignite prior to the injection of the liquid diesel fuel. This pre-combustion of the fumigant gases combined with the engine's compression of the combustion chamber gases is managed to attain a supercritical combustion chamber environment into which the liquid diesel fuel is injected. This targeted supercritical combustion chamber environment causes the diesel fuel to become a supercritical fluid prior to combustion, resulting in significantly greater efficiency and negligible exhaust gas pollutants resulting from the combustion of the diesel fuel.

Fumigation of a diesel engine air intake charge with a combustible gaseous fuel has always required that the injected liquid diesel fuel be the pilot ignition source initiating the combustion event. This allowed for accurate timing of the combustion event, reduction of the total diesel fuel consumed, and reduction of exhaust gas pollutants because the gaseous fuel combusts much more completely than the liquid diesel fuel.

Combustion of diesel fuel as a supercritical fluid causes the combustion event to resemble a gaseous fuel combustion event. As a supercritical fluid diesel fuel does not exhibit surface tension and has a diffusion two magnitudes greater than as a liquid. These are the two main properties of a supercritical fluid which contribute to greater combustion efficiency and lower exhaust gas pollutants.

Liquid diesel fuel is injected into the combustion chamber by very high pressure to effect atomization of this liquid fuel. The result is a spray composed of droplet and ligaments entering into the combustion chamber environment. There is an ignition delay time period as the liquid fuel droplets and ligaments take on heat from the combustion chamber gases and commence to vaporize. It is this diesel fuel vapor which combusts. Diesel combustion is generally considered to be a lean combustion event but this is only true when looking at the bulk number relationship for the fuel and the oxidant. Each droplet and ligament creates a very fuel rich combustion zone surrounding their surface. These rich combustion zones create "prompt" NOx (nitrogen compounds formed during elevated temperature combustion events and during fuel rich combustion) and encapsulate the remaining liquid within the droplet or ligament in a zone of extreme heat which creates pyrolysis and coking of the remaining fluid. The source of particulates in the exhaust gas and temperature created NOx.

As a supercritical fluid diesel fuel does not exhibit surface tension, therefore droplets and ligaments cannot form, or if formed cannot remain formed. This excludes the possibility of fuel rich combustion zones, reducing the production of both prompt and thermal NOx as well as the pyrolysis and coking of the diesel fuel.

The companion effect of the loss of surface tension is that the diesel fuel now has 100 times greater diffusivity than as a liquid droplet or ligament. The combustion effect is that the diesel fuel is now at least 100 times more in contact with the oxidant. The result is a combustion event that releases more heat energy in a shorter period of time than a typical diesel combustion without the formation of prompt NOx and particulates.

It is therefore an object of the present invention to provide a new and improved supercritical combustion chamber environment for compression ignition engines such as diesel engines.

It is another object of the present invention to provide a diesel engine combustion chamber environment with improved fuel efficiency.

A further object or feature of the present invention is a diesel engine combustion chamber environment with reduced NOx and soot emissions.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 3:
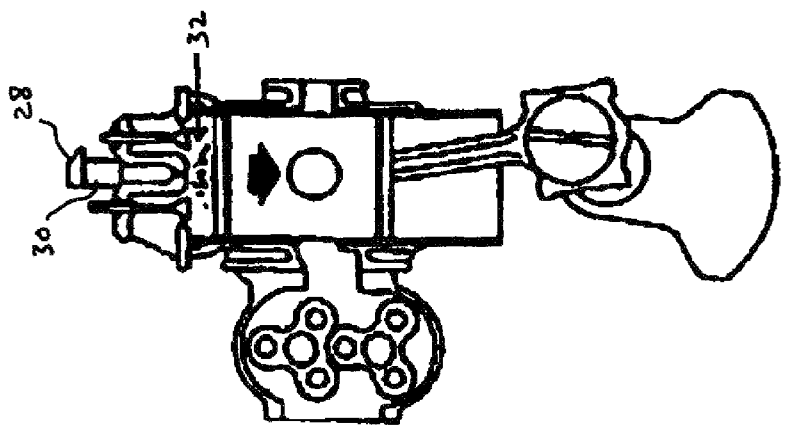
FIG. 3 is a cross sectional view of the engine at the beginning of the power stroke.

This invention applies to all compression ignition engines (CIE) which operate on diesel fuel No. 2, light fuel oil, biodiesel, water emulsified diesel fuels or blends of diesel surrogates, light fuel oil emulsions, or blends of these fuels. This invention can be readily retrofitted onto existing CIE with only slight modification between installations on two-stroke and four-stroke CIE. This invention can also be readily implemented into new CIE design and construction. The apparatus and method will change dependent on the "family of CIE" to which it is applied. "Family of CIE" is intended to categorize as functional inclusionary units similar CIE. The broadest category is the division between two and four-stroke CIE. The method and apparatus will vary when adopted for use on the different families of CIE. Rotational speed, low, medium, high will be subfamilies, as will displacement volume of the combustion chamber.

The principle of this novel combustion method will remain the same. This principle is the use of a fumigant fuel blend to establish a supercritical fluid/gas environment within the combustion chamber of the CIE prior to the injection of the liquid diesel fuel. This supercritical fluid/gas environment has a target pressure of not less than 800 psi being expressed in the constant volume space (CVS) of the combustion chamber prior to the injection of the liquid diesel fuel. CVS is generally accepted to be the combustion space compressed by the piston commencing at 10° BTDC (before top dead center, the position of the piston prior to reaching TDC) and ending at 10° ATDC (after top dead center, the position of the piston after passing TDC). To achieve this pressure and corresponding temperature, 1,200° F. to 1,400° F., the components of the inventive method and apparatus will be adapted to perform for each family of CIE. The following detailed description is an embodiment of this invention as applied to a two-stroke uniflow medium speed CIE with a displacement of greater than 500 cubic inches per cylinder. The diesel fuel is injected by mechanical unit injectors.

This type of CIE utilizes either a Roots blower or a turbo charger to compress intake air into air chambers surrounding the lower portion of the cylinder assemblies, which comprise these engines power assemblies. These air boxes have access doors to which the fumigant fuel injector will be affixed and aimed at the nearest air intake port supplying the cylinder. This injector will inject liquid fumigant fuel supplied to it by a pressure vessel fuel tank which has an internal fuel pump to boost the tank pressure so that the fuel will remain liquid throughout its route to the injector. The pulse of the injector will be controlled by a device, which, at a minimum, constantly monitors the following engine parameters: the engine rpms to establish a timing sequence for the individual injection pulse, to be timed to pulse just as the intake ports are revealed by the piston and the air charge begins to enter the combustion chamber; and the continuous reading of the individual (e.g., every fourth cylinder) pressure developed during the entire engine cycle. This precise pressure information will be interpreted by a controller, which in turn will vary the fumigant fuel injector pulse duration to provide more or less fumigant fuel to the combustion chamber. The target is 800 psi being expressed in the CVS prior to the injection of the diesel fuel. At 800 psi and the relative temperature, 1,200° F. to 1,400° F., over 90% of the gases in the CVS are supercritical. $H_2O$ and $CO_2$ will not be supercritical but $N_2$, $O_2$, OH, $H_2O_2$, and CO will all be supercritical.

The unit injector for the diesel fuel will be modified to inject the diesel fuel after TDC, e.g., 5° to 10° ATDC. The pulse duration of the unit injector will also be shortened. Because the atomized spray of the diesel fuel will encounter significantly higher combustion chamber pressure it will suffer greater shear force, greatly reducing the size of the diesel fuel droplets and ligaments. At the same time these droplets and ligaments will be innervated by the supercritical fluids/gases, which comprise the supercritical combustion chamber environment. As supercritical fluid/gases these substances become hyper-solvents.

The highly atomized diesel fuel droplets and ligaments are not only heated from the outside but also from the inside by both conduction and radiation. Supercritical substances release over 60% of their heat energy as radiant energy. At 800 psi the vaporization is delayed sufficiently to allow the combustion chamber supercritical environment to impart enough heat energy to the diesel fuel such that it transitions beyond its critical temperature point prior to initiation of significant combustion. The diesel fuel has already been pushed beyond its critical pressure point by the injectors and sustained beyond this critical pressure point by the pressure encountered in the combustion chamber. This transition beyond the critical temperature and pressure points has caused the diesel fuel to become a supercritical fluid, without surface tension and 100 times more dispersed into the supercritical combustion chamber environment. Combustion of the diesel fuel proceeds much more energetically than typical diesel fuel combustion and later in the rotation cycle of the CIE.

Typical diesel fuel combustion is timed for maximum heat release to occur in the CVS. The combustion event typically initiates just prior to the piston achieving 10° BTDC and continues to its high heat release thru 10° ATDC. Functionally from the combustion point of view, this sequence allows the diesel fuel to be reasonably combusted prior to the retained heat in the combustion chamber dropping below the temperature necessary to support combustion, about 60° ATDC. From a mechanical and heat management perspective this timing is wasteful and contributes to greater formation of NOx compounds. Mechanically, timing high heat release when the piston relationship to the crankshaft is essentially a vertical line is the time of lowest mechanical advantage and least possible transference of energy to aid in the rotation of the crankshaft. This high heat release is essentially stalled for almost a third of its active combustion sequence. The effect of this stall is to allow the heat to sink into the most readily available heat sinks, $N_2$ and $O_2$, 75% and 15% respectively of the combustion gases. This stalling of the combustion events mechanical transference and the companion sinking of heat into $N_2$ creates CIE inefficiency and increased amounts of NOx in the exhaust gas.

In the inventive method, the combustion gases are supercritical which allows the timing of the diesel fuel combustion event to be delayed to a target of high heat release at 20° ATDC. At this crank angle the transference of energy is more mechanically favorable and allows the combustion chamber space to grow much more quickly than in typical CIE combustion, thus relieving the peak heat sinking and formation of significant NOx compounds.

This supercritical combustion chamber environment is created by combining the compression of the combustion chamber gases with a sequence of pre-diesel fuel injection combustion events. The fumigant fuel injected into the air intake is a blend, and preferably a custom blend, blended for each CIE family, of propane and dimethyl ether (DME). These fuels are miscible and combined in a single pressure vessel, blended specifically for the CIE family being served, but have been determined to range from 1-20% DME and 80-99% propane. In this example the fumigant fuel is injected as a liquid. In the case of high rotational speed CIE family of engines the fumigant fuel would be injected as a gas for either two-stroke or four-stroke engines. Due to the low boiling point of the fumigant fuel components (−44° F. for propane and −11° F. for DME), these liquid fuels will vaporize in the early stages of the compression stroke and quickly homogenize with the air charge as the compression of the charge gases increases. At approximately 20° BTDC the DME will autoignite. This autoignition triggers the ignition of the propane. The fumigant fuel combustion is a two stage combustion so that the larger of the combustion events, the propane combustion, occurs just as the CVS is being entered into. This is done to lessen the backpressure on the piston. The DME combustion is principally a means to trigger the propane combustion.

The combustion chamber pressure may be continuously read by an in-cylinder pressure sensor, e.g. one for every four cylinders. The sensors output is interpreted by a controller, which increases or decreases the pulse duration of the fumigant fuel injector to best manage the fumigant fuel flow into the combustion chamber, to attain the target supercritical pressure prior to the diesel fuel injection.

Figure 2:
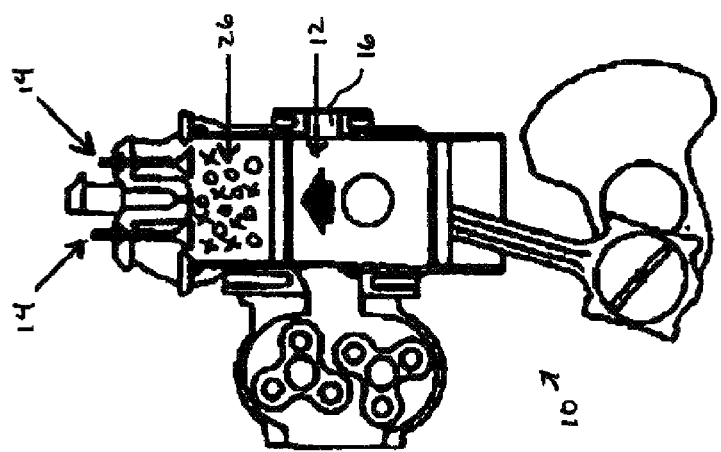
FIG. 2 is a cross sectional view of the engine at the beginning of the compression stroke.
Figure 1:
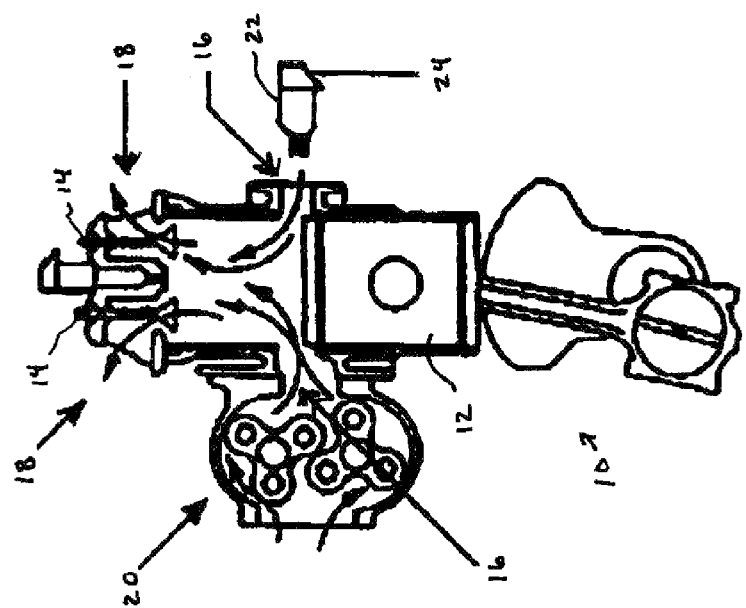
FIG. 1 is a cross sectional view of a two-stroke diesel engine with the piston in the neutral exhaust/intake position.

Referring now to FIGS. 1 through 3, wherein like reference numerals refer to like components in the various views, there is illustrated therein a new and improved method for supercritical diesel combustion.

The drawing figures illustrate a cross sectional view of a uniflow, two-stroke diesel engine. The operating principles apply as well to a four-stroke diesel engine, the difference being that the fumigant fuel injectors would be mounted on the four-stroke engines air intake manifold as close to each cylinders intake valves as possible. The fumigant fuel injector depicted is for application of the inventive system to existing diesel engines. Newly constructed engines could implement the system, optionally, by placing the fumigant fuel injector as a direct injection component, pulsing directly into the combustion chamber.

FIG. 1 depicts a two-stroke diesel engine 10 with the piston 12 at the point in which the piston is in the neutral exhaust/intake position. The exhaust valves 14 have opened just before the piston's descent which reveals the air intake ports 16 to allow the exhaust gas from the previous combustion to begin exiting thru the exhaust ports 18. As the piston continues to descend it reveals the air intake ports 16, which have been pressurized by the air compressor 20. All diesel engines operating on diesel fuel utilize some form of air compressor, such as a blower or turbocharger, to force air into the combustion chamber of the engine. Fresh intake air floods into the combustion chamber aiding in pushing the exhaust gases from the previous combustion out through the exhaust ports. Just as the fresh air begins to enter the combustion chamber the fumigant fuel injector 22, which is mounted and aimed directly at one of the air intake ports, pulses, releasing a specific volume of mixed fumigant fuel supplied by the fumigant fuel tank 24.

In low and moderate speed diesel engines (e.g., under 1200 rpm), the fumigant fuel will be injected as a liquid. High speed diesel engines will have the fumigant fuel injected as a gas to assure that complete vaporization and homogenization occurs prior to autoignition of the fumigant fuel. The fumigant fuel is a mixture of propane and dimethyl ether held in a common pressurized tank 24. Propane vaporizes at −44° F. and dimethyl ether vaporizes at −11° F., essentially both permanent gases at standard operating conditions.

FIG. 2 is a cross sectional view of the engine at the beginning of the compression stroke. The piston 12 continues to rise, closing off the air intake ports 16, the exhaust valves 14 have closed, and the compression stroke begins. As the piston slides towards the exhaust valves the combustion chamber gases are compressed and begin to rise in temperature. All diesel engines are designed so that the compression of these gases will increase in temperature well beyond the autoignition temperature of diesel fuel, prior to the piston entering the CVS. Typical diesel fuel compression ignition occurs as the diesel fuel is injected into the combustion chamber, initiating from approximately 16° BTDC. Operating with the inventive system the piston compresses the fumigant fuel air mixture 26 causing the fumigant fuel to vaporize and homogenize with the air charge. At approximately 20° BTDC the dimethyl ether will have achieved autoignition temperature and combust. This combustion will cause the propane to combust, which combined with the compression of the gases by the piston, will result in a supercritical combustion chamber environment.

FIG. 3 is a cross sectional view of the engine at the beginning of the power stroke, and the supercritical combustion chamber environment 32, with a CVS pressure of approximately 800 psi. At this pressure and corresponding temperature, 1,200 to 1,400° F., all the gases in the combustion chamber (except H2O and CO2) are supercritical fluids. Between 5° and 10° ATDC the diesel fuel from diesel fuel tank 28 is injected into this supercritical environment through diesel fuel injectors 30.

All diesel engines inject the diesel fuel at pressures 1,000's of psi above the diesel fuel critical pressure point. Because the CVS pressure is approximately 800 psi, roughly 2.5 times the critical pressure point of diesel fuel, the injected diesel fuel stays well above its critical pressure point. This injected diesel fuel is subjected to very high shear forces because of the increased pressure of the CVS, which increases atomization of the diesel fuel droplets and ligaments. The principle supercritical gases in the CVS are N2 and O2, which as supercritical fluids, act as hyper-solvents, innervating the diesel fuel droplets and ligaments thus imparting heat energy, over 60% as radiant energy, from within the diesel fuel droplet and ligament as well as from the exterior. This action by the supercritical hyper-solvents imparts heat energy into the diesel fuel such that the diesel fuel transitions into a supercritical state prior to combustion.

As a supercritical fluid diesel fuel does not have surface tension and is dispersed 100 times greater than as a liquid within the supercritical combustion chamber environment. The initiation of combustion of this supercritical diesel fuel is targeted to occur at 20° ATDC to take advantage of the maximum exertion of force at a time of greatest mechanical slider/crank leverage. Because the maximum heat release of the diesel fuel is now timed to take advantage of a much higher piston speed heat retention will be minimal and formation of NOx compounds will be significantly reduced.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method for supercritical diesel combustion comprising:
   providing a compression ignition engine having a combustion chamber;
   providing a fumigant fuel charge to the combustion chamber, said fumigant fuel charge including a mixture of a first and second flammable gas, wherein the first flammable gas is dimethyl ether;
   wherein said dimethyl ether autoignites prior to said second flammable gas to thereby cause said second flammable gas to combust, and wherein combustion of the second flammable gas raises the pressure of the combustion chamber to at least twice a diesel supercritical environment pressure level prior to the injection of a diesel fuel;
   injecting diesel fuel into the combustion chamber after autoignition of the fumigant fuel charge causes the pressure in the combustion chamber to reach twice the diesel supercritical environment pressure level, wherein said pressure in the combustion chamber at twice the diesel supercritical pressure level has a constant volume space pressure of at least 800 psi prior to the injection of the diesel fuel and a temperature of at least 1200 F, wherein the supercritical environment pressure level causes the diesel fuel to become a supercritical fluid prior to the diesel fuel combustion; and combusting the diesel fuel.

2. A method for supercritical diesel combustion cycle comprising:

providing a compression ignition engine having a combustion chamber; wherein said engine has a compression cycle concluding at a piston top dead center and an expansion cycle concluding at a piston bottom dead center;

during said compression cycle, providing a fumigant fuel mixture charge to the combustion chamber;

said fumigant fuel mixture including a mixture of a first and second flammable gas, wherein the first flammable gas is an autoignition fuel and the second flammable gas is a fumigant fuel;

wherein said autoignition fuel is conditioned to autoignite before said fumigant fuel ignites to thereby cause said fumigant fuel to combust, and wherein combustion of the fumigant fuel raises the pressure of the combustion chamber to a supercritical environment prior to the injection of a diesel fuel, wherein the supercritical environment prior to the injection of the diesel fuel has a constant volume space pressure of at least 800 psi and a temperature of at least 1200 F;

during said expansion cycle, injecting diesel fuel into the combustion chamber only when the combustion chamber reaches the supercritical environment;

transforming the diesel fuel to a supercritical state in the combustion chamber; and igniting the supercritical diesel fuel.

3. The method for supercritical diesel combustion of claim 1 wherein the second flammable gas is propane and the fumigant fuel charge comprises 1-20% dimethyl ether and 80-99% propane.

4. The method for supercritical diesel combustion of claim 1 wherein the step of providing a fumigant fuel charge comprises injecting a non-diesel fumigant fuel into an air intake port on the engine.

5. The method for supercritical diesel combustion of claim 4 wherein the fumigant fuel charge is injected as a liquid.

6. The method for supercritical diesel combustion of claim 4 wherein the fumigant fuel charge is injected as a gas.

7. The method for supercritical diesel combustion of claim 1 wherein the diesel fuel is injected into the combustion chamber after top dead center.

8. The method for supercritical diesel combustion of claim 1 wherein the diesel fuel is injected into the combustion chamber at 5° to 10° after top dead center.

9. The method for supercritical diesel combustion of claim 1 wherein the diesel supercritical environment has a constant volume space pressure of at least 800 psi prior to the injection of the diesel fuel.

10. The method for supercritical diesel combustion of claim 1 wherein the diesel supercritical environment has a temperature of 1,200° F. to 1,400° F.

11. The method for supercritical diesel combustion of claim 1 wherein the diesel fuel combusts at approximately 20° after top dead center.

12. The method for supercritical diesel combustion of claim 1 wherein the diesel fuel comprises one of the group of diesel fuel No. 2, light fuel oil, biodiesel, water emulsified diesel fuels, blends of diesel surrogates, light fuel oil emulsions, and a blend of these fuels.

13. The method for supercritical diesel combustion of claim 2, wherein the fumigant fuel mixture comprises a mixture of dimethyl ether and propane.

14. The method for supercritical diesel combustion of claim 13 wherein the autoignition fuel is dimethyl ether and the fumigant fuel is propane, and wherein the fumigant fuel mixture comprises 1-20% dimethyl ether and 80-99% propane.

15. The method for supercritical diesel combustion of claim 13 wherein the diesel fuel is injected into the combustion chamber at 5 degrees to 10 degrees after top dead center.

16. The method for supercritical diesel combustion of claim 13 wherein the diesel fuel combusts at approximately 20 degrees after top dead center.

17. The method for supercritical diesel combustion of claim 13 wherein the supercritical environment has a controller for controlling the combustion chamber to maintain constant volume space to a pressure of at least twice the diesel supercritical pressure prior to the injection of the diesel fuel and a temperature of 1,200 degrees F. to 1,400 degrees F. to create supercritical combustion chamber environment which will act as a hypersolvent and intermix with the injected diesel fuel to cause the diesel fuel to transition into a supercritical state prior to combustion.

18. The method for supercritical diesel combustion of claim 13 wherein no diesel fuel is added to the combustion chamber during the compression cycle.

19. The method of claim 1, wherein the second gas is propane.

20. The method of claim 1, wherein the diesel fuel injected into the combustion chamber is substantially pure liquid diesel fuel at the time of injection.

21. The method of claim 1, wherein the step of injecting a diesel fuel injects only diesel fuel into the combustion chamber.

22. The method of claim 1, wherein the step of injecting a diesel fuel injects only unmixed diesel fuel into the combustion chamber.

23. The method of claim 13, wherein the step of injecting a diesel fuel injects only diesel fuel into the combustion chamber.

* * * * *